United States Patent
Chun et al.

(10) Patent No.: US 8,089,988 B2
(45) Date of Patent: *Jan. 3, 2012

(54) METHOD FOR SELECTING TRANSPORT FORMAT COMBINATION GUARANTEED QOS IN MOBILE COMMUNICATION SYSTEM

(75) Inventors: Sung-Duck Chun, Seoul (KR);
Young-Dae Lee, Gyeonggi-Do (KR);
Seung-June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

This patent is subject to a terminal disclaimer.

(21) Appl. No.: 12/485,021

(22) Filed: Jun. 15, 2009

(65) Prior Publication Data

US 2009/0252107 A1    Oct. 8, 2009

Related U.S. Application Data

(63) Continuation of application No. 11/152,896, filed on Jun. 14, 2005, now Pat. No. 7,555,010.

(30) Foreign Application Priority Data

Jun. 16, 2004  (KR) .................. 10-2004-0044710

(51) Int. Cl.
*H04J 3/16* (2006.01)
*H04L 12/56* (2006.01)
*G06F 15/16* (2006.01)

(52) U.S. Cl. .............. 370/469; 370/395.2; 370/395.4; 709/229

(58) Field of Classification Search ....... 370/229–238.1, 370/464–469; 709/220–236
See application file for complete search history.

(56) References Cited

U.S. PATENT DOCUMENTS

| | | | |
|---|---|---|---|
| 5,754,537 A | 5/1998 | Jamal | |
| 6,757,738 B1 | 6/2004 | Cao et al. | |
| 6,795,435 B1 | 9/2004 | Jouppi et al. | |
| 6,826,193 B1 * | 11/2004 | Peisa | 370/437 |
| 7,321,589 B2 | 1/2008 | Lohr et al. | |
| 7,369,857 B2 * | 5/2008 | Lee et al. | 455/450 |
| 7,440,776 B2 | 10/2008 | Kikuchi | |
| 7,515,616 B2 | 4/2009 | Yi et al. | |

(Continued)

FOREIGN PATENT DOCUMENTS

CN    1407821    4/2003

(Continued)

OTHER PUBLICATIONS

3rd Generation Partnership Project (3GPP), "Universal Mobile Telecommunications System (UMTS); Services Provided by the Physical Layer", Technical Specification 3GPP TS 25.302, Version 5.5.0, Release 5, XP-014008602, Jun. 2003.

(Continued)

*Primary Examiner* — Tri H Phan

(74) *Attorney, Agent, or Firm* — Lee, Hong, Degerman, Kang & Waimey

(57) ABSTRACT

The present invention relates to selecting a transport format combination (TFC) such that a quality of service (QoS) is guaranteed in a mobile communication system of a certain level even for a service having a low priority. The present invention selects a transport format combination such that not only a priority of each service is guaranteed but also a service quality is guaranteed by an MAC layer at the time of transporting services having different QoSs and different priorities.

13 Claims, 15 Drawing Sheets

U.S. PATENT DOCUMENTS

| | | | |
|---|---|---|---|
| 7,555,010 B2 * | 6/2009 | Chun et al. | 370/469 |
| 7,583,629 B2 * | 9/2009 | Lee et al. | 370/329 |
| 2002/0021714 A1 * | 2/2002 | Seguin | 370/469 |
| 2003/0009580 A1 * | 1/2003 | Chen et al. | 709/231 |
| 2003/0112790 A1 | 6/2003 | Hayduk et al. | |
| 2003/0203736 A1 | 10/2003 | Chi et al. | |
| 2004/0097240 A1 * | 5/2004 | Chen et al. | 455/450 |
| 2004/0156330 A1 * | 8/2004 | Yi et al. | 370/328 |
| 2009/0232083 A1 | 9/2009 | Chun et al. | |
| 2009/0252105 A1 * | 10/2009 | Chun et al. | 370/329 |
| 2009/0252106 A1 | 10/2009 | Chun et al. | |

FOREIGN PATENT DOCUMENTS

| | | |
|---|---|---|
| EP | 01209940 | 5/2002 |
| JP | 2002-026991 | 1/2002 |
| JP | 2002-527945 | 8/2002 |
| JP | 2002-271848 | 9/2002 |
| JP | 2003-018202 | 1/2003 |
| WO | 02/19619 | 3/2002 |

OTHER PUBLICATIONS

LG Electronics Inc., "QoS Guaranteed TFC Selection," 3GPP TSG-RAN WG2 REL-6 ad hoc, R2-041346, Jun. 2004.

3rd Generation Partnership Project (3GPP), "Technical Specification Group Services and System Aspects; QoS Concept and Architecture (Release 1999)," 3GPP TS 23.107, V3.5.0, Dec. 2000.

* cited by examiner

METHOD FOR SELECTING TRANSPORT FORMAT COMBINATION GUARANTEED QOS IN MOBILE COMMUNICATION SYSTEM

CROSS-REFERENCE TO RELATED APPLICATIONS

This application is a continuation of U.S. application Ser. No. 11/152,896 filed on Jun. 14, 2005, now U.S. Pat. No. 7,555,010, which pursuant to 35 U.S.C. §119(a), claims the benefit of earlier filing date and right of priority to Korean Application No. 2004-0044710, filed on Jun. 16, 2004, the contents of which are hereby incorporated by reference herein in their entirety.

FIELD OF THE INVENTION

The present invention relates to a method for selecting a transport format combination for transporting data proper to a channel circumstance by a transmitting side medium access control (MAC) layer in a universal mobile telecommunication system (UMTS) and a European international mobile telecommunication (IMT) 2000 system. The present invention relates, in particular, to a method for selecting a transport format combination (TFC) such that a quality of service (QoS) is guaranteed in a mobile communication system of a certain level even for a service having a low priority.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access (W-CDMA) technologies.

In December 1998, ETSI of Europe, ARIB/TTC of Japan, T1 of the United States, and TTA of Korea formed a Third Generation Partnership Project (3GPP) for creating detailed specifications of the UMTS technology. Within the 3GPP, in order to achieve rapid and efficient technical development of the UMTS, five technical specification groups (TSG) have been created for determining the specification of the UMTS by considering the independent nature of the network elements and their operations.

Each TSG develops, approves, and manages the specification within a related region. Among these groups, the radio access network (RAN) group (TSG-RAN) develops the specifications for the functions, requirements, and interface of the UMTS terrestrial radio access network (UTRAN), which is a new radio access network for supporting W-CDMA access technology in the UMTS.

A related art UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes at least one radio network subsystem (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is well known in communications systems.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions and a control plane for carrying control information for the maintenance and management of the interface. The radio interface protocols are provided in the UE and the UTRAN as a pair, and transmit data within a radio period. Each radio interface protocol layer will be explained.

A first layer, a physical layer (PHY) transmits data to a radio period by using various radio transport techniques. Specifically, the physical layer (PHY) provides information transfer service to a higher layer and is linked via a transport channel (TrCH) to a medium access control (MAC) layer. Through the transport channel (TrCH), data of a wire period is transported reliably between the PHY layer and the MAC layer. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

The second layer includes a MAC layer, a radio link control (RLC) layer, a broadcast/multicast control (BMC) layer and a packet data convergence protocol (PDCP) layer. The MAC layer maps various logical channels (LoCH) to various transport channels. The MAC layer also multiplexes logical channels by mapping several logical channels to one transport channel. The MAC layer is connected to an upper RLC layer via the logical channel. The logical channel can be divided into a control channel for transmitting control plane information a traffic channel for transmitting user plane information according to the type of information transmitted.

The MAC layer is divided into a MAC-b sublayer, a MAC-d sublayer, a MAC-c/sh sublayer, a MAC-hs sublayer and a MAC-e sublayer according to the type of transport channel being managed. The MAC-b sublayer manages a broadcast channel (BCH), which is a transport channel handling the broadcast of system information. The MAC-c/sh sublayer manages common transport channels such as an FACH (Forward Access Channel) or a DSCH (Downlink Shared Channel) that is shared by other terminals. The MAC-d sublayer handles the managing of a DCH (Dedicated Channel), namely, a dedicated transport channel for a specific terminal. In order to support uplink and downlink high speed data transmissions, the MAC-hs sublayer manages an HS-DSCH (High Speed Downlink Shared Channel), namely, a transport channel for high speed downlink data transmission, and the MAC-e sublayer manages an E-DCH (Enhanced Dedicated Channel), namely, a transport channel for high speed uplink data transmissions.

The RLC layer guarantees a quality of service (QoS) of each radio bearer (RB) and handles the transmission of corresponding data. The RLC layer includes one or two independent RLC entities for each RB in order to guarantee a particular QoS of each RB. The RLC layer also provides three RLC modes, namely, a Transparent Mode (TM, an Unacknowledged Mode (UM) and an Acknowledged Mode (AM), to support various types of QoS. Also, the RLC controls the size of data to be suitable for a lower layer in transmitting over a radio interface. For this purpose, the RLC segments and concatenates the data received from the upper layer.

A PDCP (Packet Data Convergence Protocol) layer is a higher layer of the RLC layer and allows the data transmitted through a network protocol (such as an IPv4 or IPv6) to be effectively transmitted over a radio interface with a relatively small bandwidth. To achieve this, the PDCP layer performs a header compression function wherein only necessary information is transmitted in a header part of the data to thereby increase transmission efficiency over the radio interface. Because the PDCP layer performs the header compression as a basic function, it exists only at a packet switched (PS) domain. One PDCP entity is provided per RB to provide an effective header compression function with respect to each PS service.

A BMC (Broadcast/Multicast Control) layer, located at an upper portion of the RLC layer in the second layer (L2), schedules a cell broadcast message and broadcasts the message to terminals located in a specific cell.

A radio resource control (RRC) layer located at the lowest portion of the third layer (L3) is defined in the control plane and controls the parameters of the first and second layers with respect to the establishment, reconfiguration and release of RBs. The RRC layer also controls logical channels, transport channels and physical channels. Here, the RB refers to a logical path provided by the first and second layers of the radio protocol for data transmission between the terminal and the UTRAN. In general, the establishment of the RB refers to stipulating the characteristics of a protocol layer and a channel required for providing a specific data service, and setting their respective detailed parameters and operation methods.

Hereinafter, a method for selecting a transport format combination (TFC) performed by the MAC layer will be explained. The TFC selection is for selecting a transport block (TB) of a suitable size and the number of the TBs according to a wireless channel circumstance momentarily changed to thereby efficiently utilize a limited radio resource. The MAC layer transports transport blocks (TBs) to the PHY layer through a transport channel. A transport format (TF) is a definition for a TB size and the number of TBs to be transported by one transport channel. At the time of determining TFs for a specific transport channel, the MAC layer considers transport channel multiplexing in the PHY layer.

Transport channel multiplexing is for mapping plural transport channels into one coded composite transport channel (CCTrCH). Even if the PHY layer performs the transport channel multiplexing, the MAC layer considers every transport channel mapped into the same CCTrCH at the time of determining TFs. Since an amount of data processed by the PHY layer is an amount of data transported through the CCTrCH, the MAC layer determines TFs of each transport channel in consideration to the CCTrCH.

Presently, a combination of TFs is known as a transport format combination (TFC). The TFC is not determined by the MAC layer itself, but rather is selected from a set of available traffic flow templates (TFTS) indicated by the RRC layer of the UTRAN. That is, the RRC layer of the UTRAN informs the MAC layer of a set of available TFCs for one CCTrCH at the time of an initial RB setting, and the MAC layer selects a proper TFC from a set of available TFCs (TFCS) within each transmission time interval (TTI). A terminal RRC receives TFCS information from a UTRAN RRC via an air interface, and informs a terminal MAC layer of the received TFCS information.

The main function of the MAC layer is for selecting an optimum TFC in a TFCS within each TTI. The optimum TFC selection is divided into two steps. First, a valid TFCS is constructed in a TFCS allocated to the CCTrCH. Then, the optimum TFC is selected in the valid TFCS. The valid TFCS is a set of available TFs at a corresponding TTI in a preset TFCS, which is formed because a radio channel circumstance is momentarily changed and thereby a maximum transmission power of a terminal is changed. Since an amount of transmittable data is generally proportional to a size of transmission power, available TFCs are limited by the maximum transmission power.

An optimum TFC indicates a TFC that can optimally transmit data to be transmitted in a valid TFCS limited by the maximum transmission power. The optimum TFC is selected in a valid TFCS on the basis of a logical channel priority, not on the basis of a data transmission amount. Eight priorities, 1 to 8, with 1 being the highest priority, are set to a logical channel. In case that plural logical channels are multiplexed to one transport channel and plural transport channels are multiplexed to one CCTrCH, the MAC layer selects a TFC that can optimally transmit logical channel data having a high priority.

FIG. 3 illustrates a general method for selecting a TFC. FIG. 4 illustrates a structure wherein plural logical channels and plural transport channels are multiplexed to one CCTrCH. The process for selecting a TFC by the MAC layer will be explained with reference to FIG. 4. FIG. 4 illustrates a case wherein three logical channels (LoCH) and two transport channels (TrCH) are mapped into the CCTrCH. It further illustrates a case where a LoCH1 and a LoCH2 are multiplexed to the TrCH1. Here, the LoCH1 has a priority of 1, the LoCH2 has a priority of 5, and the LoCH3 has a priority of 3. Accordingly, the LoCH1 has the highest priority.

The MAC layer selects an optimum TFC in a preset TFCS within each TTI. As shown in FIG. 4, the TFCS is not determined by the MAC layer but is transmitted to the MAC layer from the RRC when the RRC configures an RB. In FIG. 4, 16 TFCs are defined, each TFC having an identification number called a TFC index. The numbers inside the round bracket (x, y) originally indicated the number of TBs of the TrCH1 having a size 1 and the number of TBs of the TrCH2 having a size 2, respectively. However, in the present invention, the size of every TB is preferably equal to each other. Thus, the numbers inside the round bracket denote the number of TBs of the TrCH1 and the number of TBs of the TrCH2.

Referring to FIG. 4, it is assumed that each Tx Buffer 1, Tx Buffer 2, and Tx Buffer 3 of the RLC respectively have 3, 4, and 2 data blocks (TB) that are in a transmission waiting state. Furthermore, it is assumed that a maximum 10 TBs can be transmitted by a limited maximum transmission power.

Under this state, the MAC layer selects an optimum TFC (TFCI=11) by a method illustrated in FIG. 5.

The method for selecting an optimum TFC illustrated in FIG. 5 will be explained in more detail with reference to FIG. 3. Referring to FIG. 5, when 16 TFCs are provided (1), a maximum 10 TBs can be transmitted by a limited transmission power. Accordingly, the MAC layer configures a valid TFCS excluding TFCI=13 and TFCI=15 in a given TFCS (2) (S11). TFCI=13 and TFCI=15 are excluded because the sum of their respective TBs on TrCH1 and TrCH2 exceeds 10 TBs. For example, for TFCI=13, there are 6 TBs present on TrCH1 and 6 TBs present on TrCH2. Therefore, the sum of the TBs on TrCH1 and TrCH2 equals 12. 12 exceeds the maximum number of TBs that can be transmitted 10. Thus, the MAC layer excludes TFCI=13 when configuring the valid TFCS (2).

In the valid TFCS, the MAC layer excludes a TFC which transmits more TBs than the total number of TBs stored in the Tx buffer of the RLC at each transport channel. The reason for excluding a TFC greater than a data amount of the transport channel is as follows. If a TFC greater than a data amount of the transport channel is selected, the RLC must generate a TB comprised of only a padding without data, thus causing a waste of radio resources.

Referring to FIG. 4, the TrCH1 has a total 7 TBs resulting from the sum of the TBs stored in the Tx buffer 1 (3 TBs) and Tx buffer 2 (4 TBs). These TBs are transmitted to the TrCH1 via the LoCH1 and the LoCH2, respectively. Accordingly, the MAC layer excludes TFCI=14 because the number of TBs for TrCH1 of TFCI=14 equals 8. Because 8 exceeds the total number of TBs for TrCH1 of FIG. 4 (7 TBs), TFCI=14 is excluded. Likewise, because the TrCH2 of FIG. 4 has 2 TBs, the MAC layer excludes the TFCI=9 and TFCI=12 because their number of TBs for TrCH2, 4 TBs and 4 TBs, respectively exceeds 2 TBs. The MAC layer then goes on to configure a new valid TFCS excluding the TFCI=9, 12, and 14 (3) (S12).

Because the LoCH1 has the highest priority of 1, the MAC layer configures a new valid TFCS on the basis of the LoCH1. Since the LoCH1 has three TBs, the MAC layer selects TFCs which can optimally transmit the data of the LoCH1. Here, the MAC layer selects the TFCI=6, 7, 8, 10, and 11 because the number of TBs for TrCH1 of each TFCI is greater than 3. Accordingly, a new valid TFCS (4) is configured excluding TFCI=0, 1, 2, 3, 4, and 5 of step (3) (S13).

Subsequently, the MAC layer configures a new valid TFCS on the basis of the LoCH3 having the next highest priority. Since the LoCH3 has two TBs, the MAC layer selects TFCs which can optimally transmit the data of the LoCH3. Here, the MAC layer selects the TFCI=8 and the TFCI=11 because the number of TBs for TrCH2 of each TFCI is equal to or greater than 2. Thus, a new valid TFCS (5) is configured excluding TFCI=6, 7, and 10 of step (4).

Furthermore, the MAC layer configures a new valid TFCS on the basis of the LoCH2 having the next highest priority. Since the LoCH2 has three TBs, the MAC layer selects the TFC which can optimally transmit the data of the LoCH2. Here, the MAC layer selects the TFCI=11 because it has the greatest number of TBs for TrCH1 among the TFCIs left in the valid TFCS (5). Accordingly, a new valid TFCS (6) is configured excluding TFCI=8 of step (5) (S13-S14).

If there is a logical channel not constituting the valid TFCS, that is, a logical channel not included in the valid TFCS (S15), the MAC layer performs the step (4). However, if there is no logical channel not included in the valid TFCS, the MAC layer selects an arbitrary TFC within the configured valid TFCS as an optimum TFC (S16). Here, because there is only one TFC in the valid TFCS, the TFCI=11 is selected as the optimum TFC (6). Eventually, the number of TBs to be transmitted to each logical channel within the TTI are LoCH1=3, LoCH2=3, and LoCH3=2.

For reference, the order of the steps 2 and 3 in the above method may be interchanged.

In a conventional method for selecting a transport format combination, the MAC layer selects a TFC on the basis of a priority of a logical channel. That is, a TFC that can optimally transmit data of a logical channel having the highest priority is selected. However, data of a logical channel having a low priority may not be transmitted at all.

Referring to FIG. 4, the above problem will be explained. If the LoCH1 having the highest priority has 7 TBs, the MAC layer selects the TFCI=14=(8,0) by the method of FIG. 5. Accordingly, each logical channel has the following number of TBs to be transmitted within the TTI (LoCH1=7, LoCH2=1, and LoCH3=0), which is shown in FIG. 6.

A situation where data can not be transmitted due to a transmission of data of a logical channel having a higher priority despite there being transmittable data is referred to as starvation. As long as a TFC is selected on the basis of an absolute priority of a logical channel like in a general TFT selection method, starvation may occur.

Starvation significantly lowers the quality of a specific service. For example, for a real-time packet service such as audio streaming, a certain amount of data has to be continuously transmitted. However, if starvation occurs due to a priority of a logical channel, packets that have not been transmitted for a long time are no longer required and are discarded, thereby lowering the quality of service.

SUMMARY OF THE INVENTION

The present invention is directed to a method for selecting a transport format combination (TFC) such that a quality of service (QoS) is guaranteed in a mobile communication system even for a service having a low priority by selecting a transport format combination that guarantees not only a priority of each service but also a quality of service by a MAC layer at the time of transporting services having different QoSs and different priorities.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for selecting a transport format combination for transmitting a plurality of data units within a transmission time interval by multiplexing data units from a plurality of upper layer channels to a lower layer channel, the transport format combination selected from a determined transport format combination set and a transmission priority exists for transmitting the data units from each of the plurality of upper layer channels, wherein at least one of the plurality of upper layer channels has an associated minimum quality of service (QoS) requirement and the transport format combination is selected such that the minimum quality of service (QoS) for the at least one upper layer channel is guaranteed. Preferably, the plurality of upper layer channels are logical channels and the lower layer channel is a coded composite transport channel.

In one aspect of the present invention, the transport format combination is selected by considering the minimum quality of service (QoS) requirement of the at least one upper layer channel before considering the transmission priority of the plurality of upper layer channels. The multiplexing may be performed at the lower layer. The multiplexing may be performed at a medium access control (MAC) layer.

In another aspect of the present invention, the minimum quality of service (QoS) comprises at least one of a minimum bit rate, a guaranteed bit rate and a minimum transfer delay. The minimum quality of service (QoS) is guaranteed by the transport format combination set determined at a radio resource control layer. However, the minimum quality of service (QoS) may be guaranteed by selection of the transport format combination at a medium access control (MAC) layer. Preferably, the transport format combination is selected by considering the minimum QoS requirement of the at least one upper layer channel before considering the transmission priority of the plurality of upper layer channels only if data units are to be transmitted over the at least one logical channel.

Preferably, the plurality of upper layer channels and the lower layer channel are in a UTRAN. Alternatively, the plurality of upper layer channels and the lower layer channel are in a mobile terminal, wherein the minimum quality of service (QoS) is guaranteed by a transport format combination set determined at a radio resource control layer of a UTRAN.

In another embodiment of the present invention, a method for transmitting a plurality of data units within a transmission time interval by multiplexing data units from a plurality of upper layer channels to a lower layer channel, the plurality of upper layer channels each having a different transmission priority for transmitting the data units comprises determining whether at least one of the plurality of upper layer channels has an associated minimum quality of service (QoS) requirement, and if at least one of the plurality of upper layer channels has an associated minimum QoS requirement, selecting a transport format combination from a determined transport format combination set such that the minimum QoS for the at least one upper layer channel is guaranteed.

In one aspect of the present invention, the minimum QoS is guaranteed by the transport format combination set determined at a radio resource control layer. Otherwise, the minimum QoS is guaranteed by selection of the transport format combination at a medium access control (MAC) layer.

In another aspect of the present invention, the method further comprises determining whether any data units are to be transmitted over the at least one upper layer channel having an associated minimum quality of service (QoS) requirement, wherein the transport format combination is selected by considering the minimum QoS requirement of the at least one upper layer channel before considering the transmission priority of the plurality of upper layer channels only if data units are to be transmitted over the at least one upper layer channel.

Preferably, the plurality of upper layer channels are logical channels and the lower layer channel is a coded composite transport channel. The multiplexing is performed at the lower layer. Preferably, the multiplexing is performed at a medium access control (MAC) layer.

The minimum quality of service (QoS) comprises at least one of a minimum bit rate, a guaranteed bit rate and a minimum transfer delay. The plurality of upper layer channels and the lower layer channel are in a UTRAN. Alternatively, the plurality of upper layer channels and the lower layer channel are in a mobile terminal, wherein the minimum QoS is guaranteed by a transport format combination set determined at a radio resource control layer of a UTRAN.

In another embodiment of the present invention, a mobile communication device for transmitting a plurality of data units within a transmission time interval comprises an RF module, an antenna, a storage unit adapted to store the data and the control information, a display adapted to convey information to the user, and a processing unit adapted to select a transport format combination for transmitting the plurality of data units within a transmission time interval by multiplexing data units from a plurality of upper layer channels to a lower layer channel, the transport format combination selected from a determined transport format combination set and a transmission priority exists for transmitting the data units from each of the plurality of upper layer channels, wherein at least one of the plurality of upper layer channels has an associated minimum quality of service (QoS) requirement and the transport format combination is selected such that the minimum quality of service (QoS) for the at least one upper layer channel is guaranteed.

In another embodiment of the present invention, a network for providing a service to a mobile terminal comprises a transmitter adapted to transmit data and a control information indicator to the mobile terminal via a first channel and to transmit control information to the mobile terminal via a second channel, a receiver adapted to receive information from the mobile terminal, and a controller adapted to select a transport format combination for transmitting a plurality of data units within a transmission time interval by multiplexing data units from a plurality of upper layer channels to a lower layer channel, the transport format combination selected from a determined transport format combination set and a transmission priority exists for transmitting the data units from each of the plurality of upper layer channels, wherein at least one of the plurality of upper layer channels has an associated minimum quality of service (QoS) requirement and the transport format combination is selected such that the minimum quality of service (QoS) for the at least one upper layer channel is guaranteed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings.

The present invention relates to a method for selecting a transport format combination capable of preventing a specific service having a low priority from causing a starvation when selecting an optimum TFC by a MAC layer when the specific service requires a minimum QoS. The method includes the following two methods: a first method for configuring a TFCS by considering a minimum QoS of a specific service and a second method for selecting a TFCS by considering a minimum QoS of a specific service.

The first method is for configuring a TFCS that can guarantee a QoS when a specific service requires a minimum QoS when configuring an RB for the specific service by an RRC layer. The minimum QoS includes a minimum bit rate and a minimum delay, which is a characteristic required for a real-time service such as voice or streaming data. The RRC layer configures a TFCS that can guarantee a minimum QoS and configures a new TFCS whenever an RB for a specific service is initially configured or whenever the RB is re-configured during a data transmission, such as when a mapping structure of a logical channel or a transport channel is changed in order to transmit the new TFCS to a MAC layer, for example.

Figure 7:
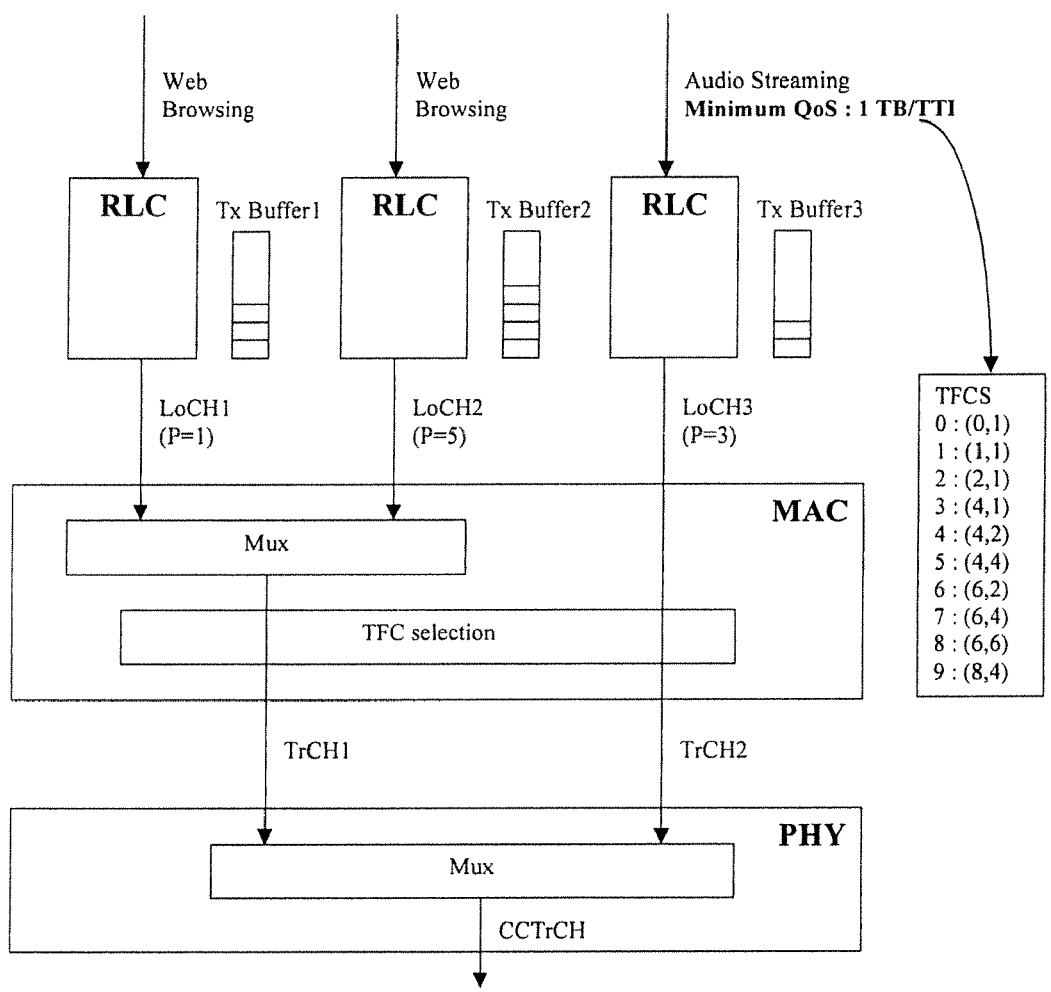
FIG. 7 illustrates a method for configuring a transport format combination set guaranteed a minimum QoS of a specific logical channel by an upper layer in accordance with one embodiment of the present invention.

According to the present invention, when a new audio streaming service is to be provided to an LoCH3 under a state that an LoCH1 and an LoCH2 provide an interactive type service such as web browsing, the RRC configures a TFCS by considering a minimum QoS of the audio streaming service. If the required minimum QoS of the audio streaming service is to transmit at least one TB within each TTI, the RRC configures a TFCS, as shown in FIG. 7. The TFCS shown in FIG. 7 is a TFCS exclusively constituted with TFCs that can transmit at least one TB.

Figure 8:
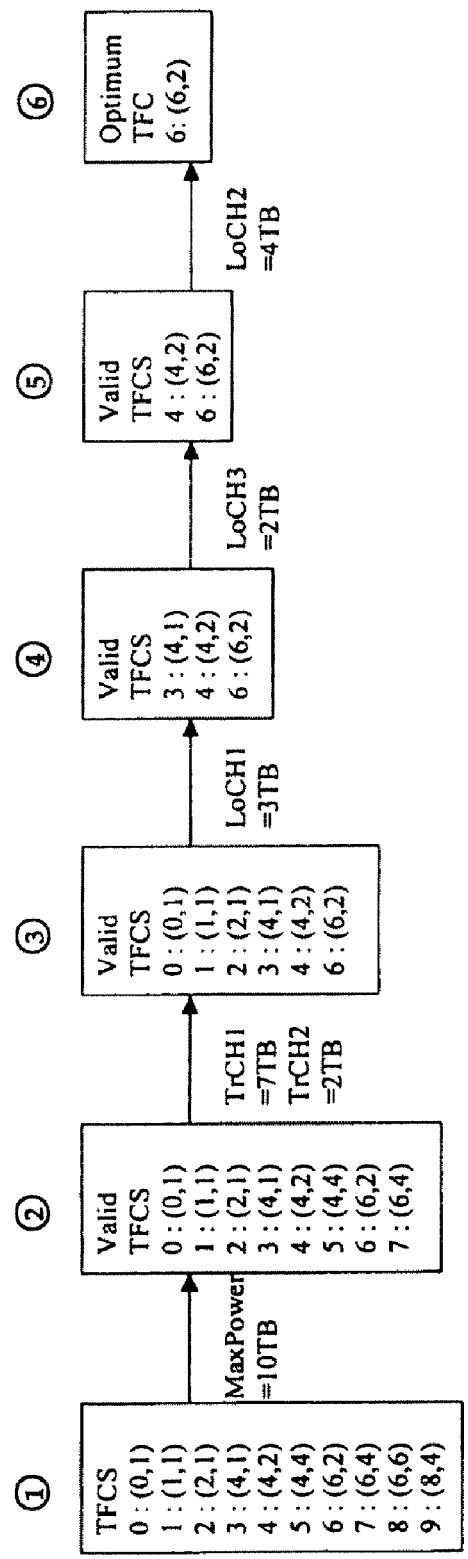
FIG. 8 illustrates a method for selecting an optimum transport format combination when a number of transport blocks of a logical channel having highest priority is 3 in a transport format combination set of FIG. 7.
Figure 9:
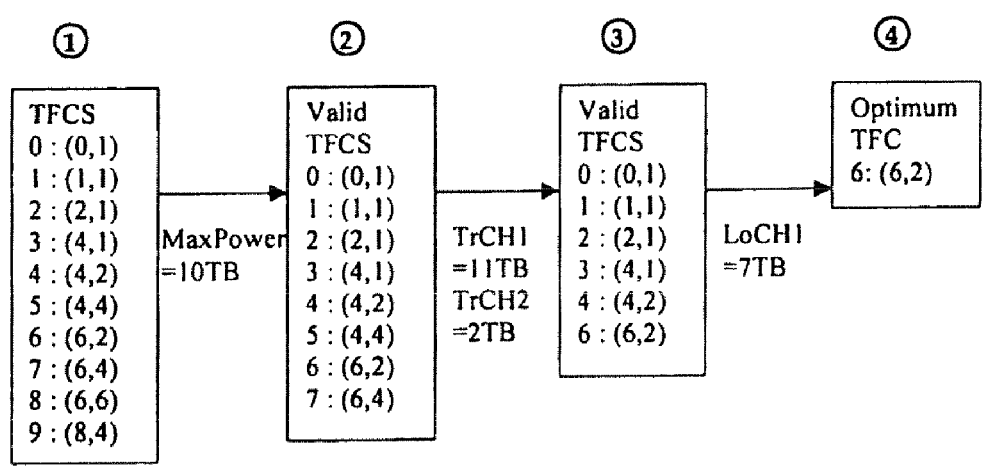
FIG. 9 illustrates a method for selecting an optimum transport format combination when a number of transport blocks of a logical channel having highest priority is 7 in a transport format combination set of FIG. 7.

FIG. 8 illustrates a method for selecting an optimum TFC when a number of TBs for LoCH1 is 3 in FIG. 7. FIG. 9 illustrates a method for selecting an optimum TFC when a number of TBs for the LoCH1 is 7 in FIG. 7.

Referring to FIG. 7, in a case where a TFCS excludes a TFC having zero number of TBs for TrCH2, the MAC layer selects a TFCI=6=(6, 2) when a TB of the LoCH1 is 3 by the method illustrated in FIG. 8. The MAC layer also selects a TFCI=6=(6, 2) when a TB of the LoCH1 is 7 by the method illustrated in FIG. 9. Accordingly, the LoCH3 can continuously transmit data without starvation.

However, the first method has the following characteristics. First, a data transmission is influenced by a radio channel circumstance and may be stopped in some cases. The state that the data transmission is stopped is referred to as a blocked state. At the time of the blocked state, a TFCI=0=(0, . . . , 0) having an empty TFC is selected to stop the data transmission since a MaxPower has no TB (MaxPower=0 TB). However, since no empty TFC exists in the present invention according to the first method, no valuable TFC exists in a valid TFCS of step (2) of FIG. 8 and thereby a protocol error may be caused.

Second, even if a logical channel requires a minimum QoS, there may be no data to transmit. In this case, the MAC layer selects a TFC that can transmit at least one TB by the first method. Accordingly, the RLC generates a padding block or a protocol error may be caused. This corresponds to the case where the LoCH3 in FIG. 7 has 0 TB. If the LoCH3 has 0 TB, then no valuable TFC exists in a valid TFCS of step (5) of FIG. 8 and thereby a protocol error is caused.

Third, a new TFCS has to be constructed whenever an RB is configured or re-configured, so that wireless signaling overhead is increased. The reason is as follows. The TFCS is basically configured by a UTRAN RRC layer, and a terminal receives the configured TFCS wirelessly. If the TFCS is re-constructed whenever an RB is configured or re-configured, TFCS information has to be transmitted wirelessly at each moment thereby increasing signaling overhead.

The second method for selecting a TFCS by considering a more improved minimum QoS according to the present invention will now be explained. The second method has the same TFCS configuration as the first method, but is different from the first method in that a MAC layer selects an optimum TFC by considering a minimum QoS before a priority of a corresponding logical channel thereof. The second method provides indication information for guaranteeing a minimum QoS of a specific logical channel to the MAC layer by an upper layer such as an RRC layer or a RLC layer. The second method will be explained with reference to FIG. 10.

Figure 10:
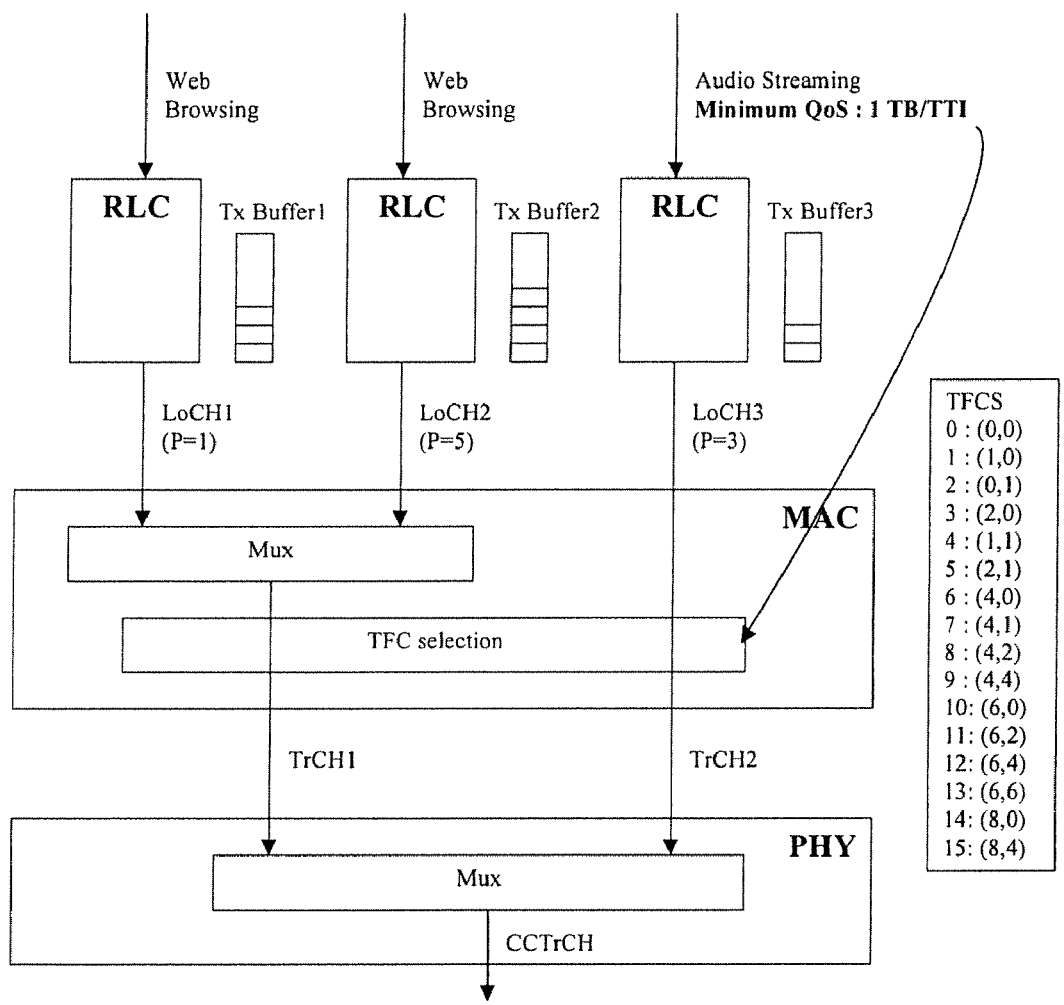
FIG. 10 illustrates a method for indicating a guarantee of a minimum QoS of a specific logical channel to an MAC layer by an upper layer in accordance with one embodiment of the present invention.
Figure 11:
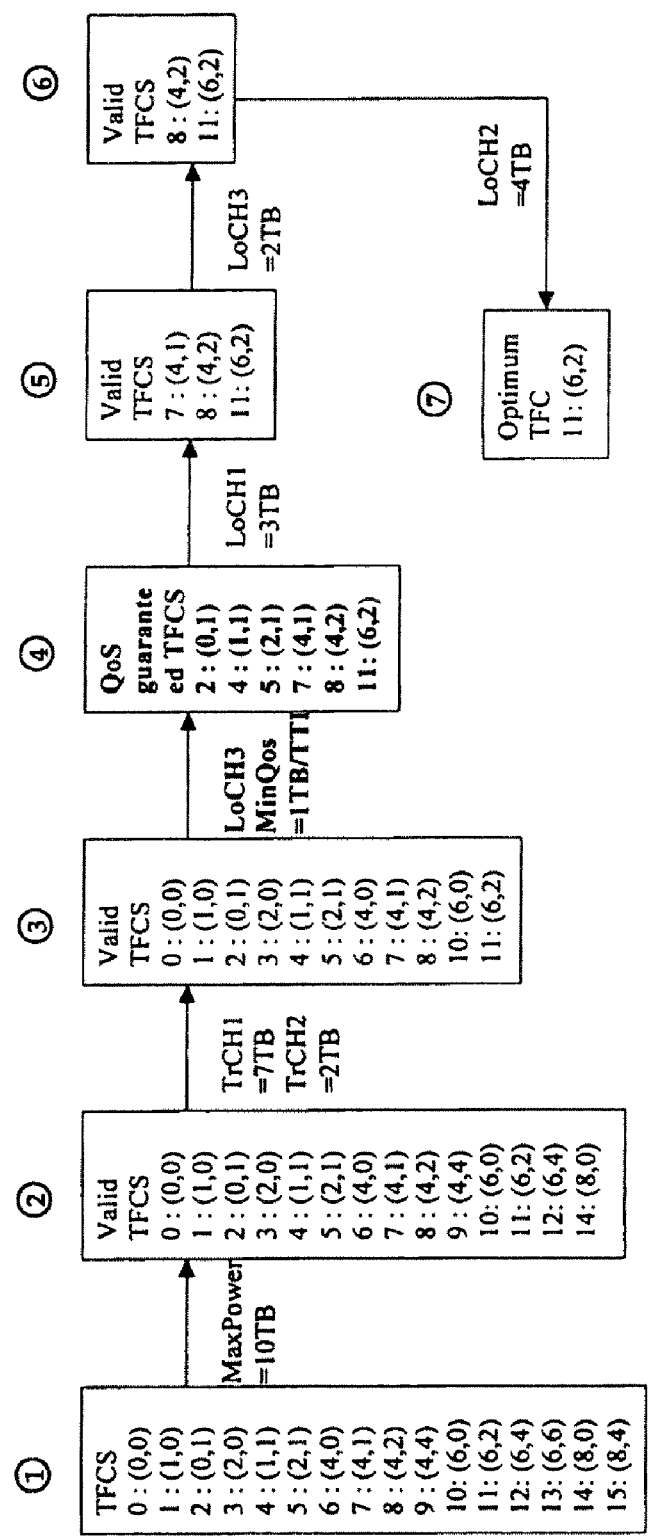
FIG. 11 illustrates a method for selecting an optimum transport format combination when a number of transport blocks of a logical channel having highest priority is 3 according to the indication for a guarantee of a minimum QoS by the upper layer in accordance with one embodiment of the present invention.
Figure 12:
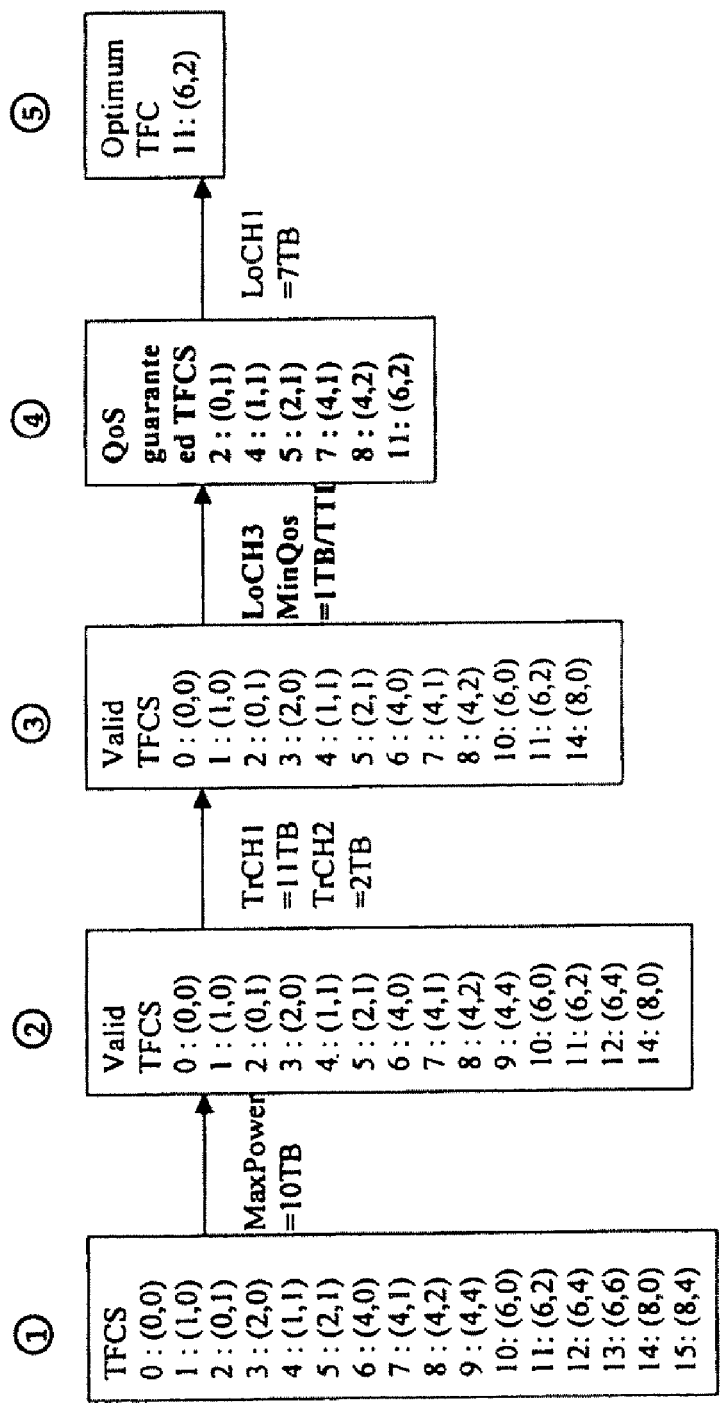
FIG. 12 illustrates a method for selecting an optimum transport format combination when a number of transport blocks of a logical channel having highest priority is 7 according to the indication for a guarantee of a minimum QoS by the upper layer in accordance with one embodiment of the present invention.
Figure 13:
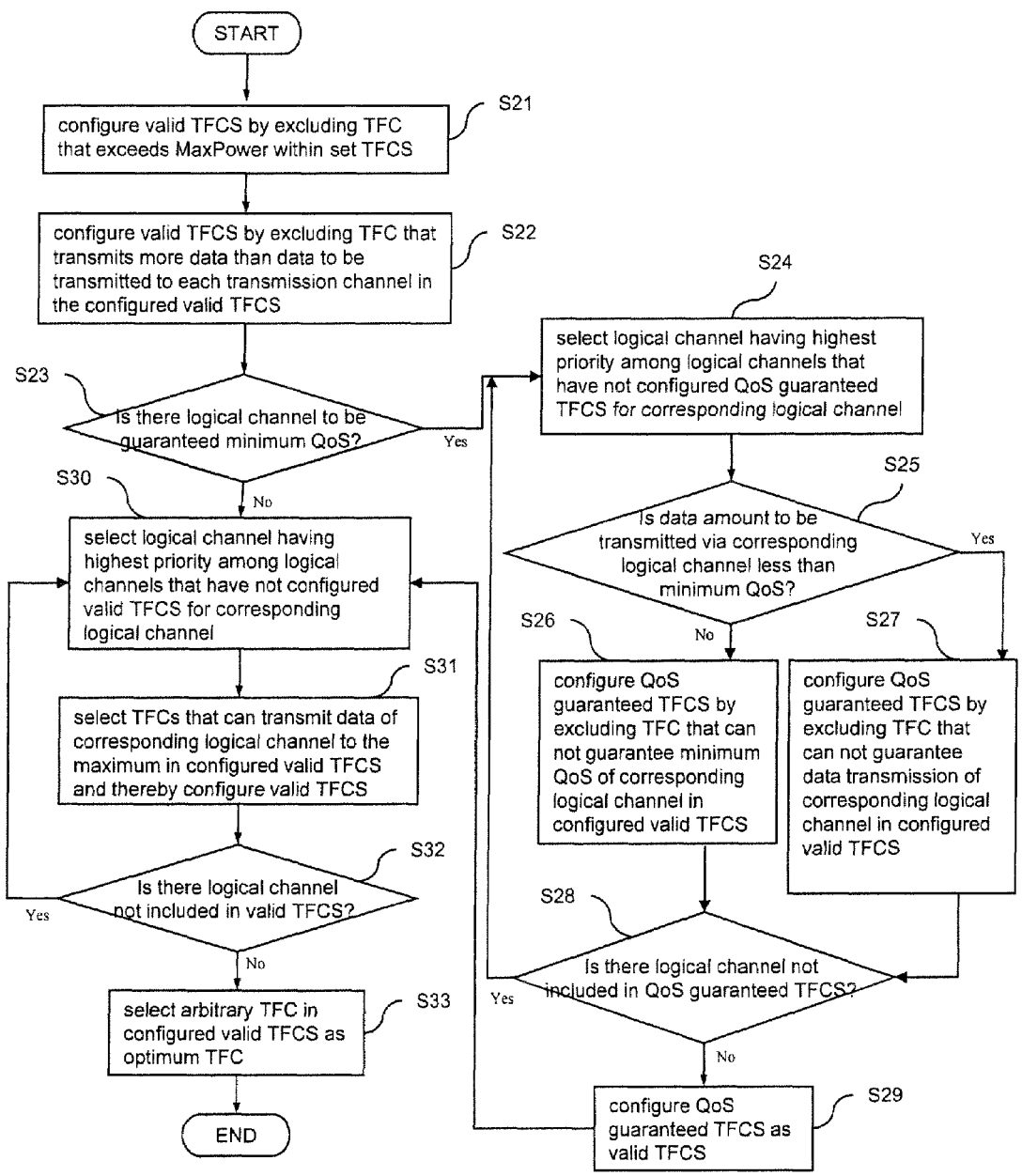
FIG. 13 illustrates a method for selecting a transport format combination guaranteed a minimum QoS by an MAC layer in accordance with one embodiment of the present invention.

FIG. 10 illustrates a structure of a protocol layer for indicating a guarantee of a minimum QoS of a specific logical channel to an MAC layer by an upper layer such as an RRC layer or an RLC layer according to the present invention. FIG. 11 illustrates a method for selecting an optimum TFC when a number of TBs for LoCH1 is 3 in FIG. 10. FIG. 12 illustrates a method for selecting an optimum TFC when a number of TBs for the LoCH1 is 7 in FIG. 10. FIG. 13 illustrates a method for selecting a TFC guaranteed a minimum QoS according to the present invention. When compared with the general TFT selection method, the present invention further comprises a method for configuring a TFCS by considering a minimum QoS for a specific logical channel (S23-S29 of FIG. 13).

As shown in FIG. 10, when an upper layer, such as an RRC layer transmits an indication for guaranteeing a minimum QoS=1 TB/TTI for the LoCH3 to the MAC layer, the MAC layer selects a TFCI=6=(6, 2) when a number of TBs of the LoCH1 is 3 by the method illustrated in FIG. 13. The MAC layer also selects a TFCI=6=(6, 2) when a number of TBs of the LoCH1 is 7 by the method illustrated in FIG. 12. Accordingly, the LoCH3 can continuously transmit data without starvation in any case as in the first method.

The second method will be explained in more detail with reference to FIG. 11. The MAC layer configures a valid TFCS (2) by excluding TFCs which exceed a maximum transmission power (MaxPower) from the TFCS (1). Preferably, the MAC configures a valid TFCS by excluding from the set TFCS a TFC wherein the sum of a number of TBs of a TrCH1 and a number of TBs of a TrCH2 exceeds 10 TB (the number of transmittable TBs in case of a MaxPower).

Subsequently, the MAC layer configures a valid TFCS (3) of FIG. 11 by excluding a TFC which transmits more TBs than the total number of TBs stored in the Tx buffer of the upper layer at each transport channel (S22 of FIG. 13).

When the MAC layer has received an indication for guaranteeing a minimum QoS for a specific logical channel from the RRC layer, that is, when a logical channel of which minimum QoS is to be guaranteed exists (S23 of FIG. 13), the MAC layer selects a logical channel having the highest priority among logical channels that have not configured a TFCS QoS guaranteed for the specific logical channel (S24 of FIG. 13) and then checks the amount of data to be transmitted via the selected logical channel (S25 of FIG. 13).

As shown in FIG. 10, since a logical channel to be guaranteed a minimum QoS is the LoCH3, the MAC layer selects the LoCH3 and then compares the data amount to be transmitted via the selected LoCH3 with the minimum QoS=1 TB/TTI. If the amount of data to be transmitted via the selected LoCH3 is not less than the minimum QoS=1 TB/TTI, the MAC layer configures a QoS guaranteed TFCS by excluding from the valid TFCS a TFC that cannot guarantee the minimum QoS of the LoCH3 (S26 of FIG. 13; (4) of FIG. 11; and (4) of FIG. 12).

However, if the amount of data to be transmitted via the selected LoCH3 is less than the minimum QoS=1 TB/TTI, the MAC layer configures a QoS guaranteed TFCS by excluding from the valid TFCS a TFC that can not guarantee a data transmission of the LoCH3 (S27 of FIG. 13).

Figure 1:
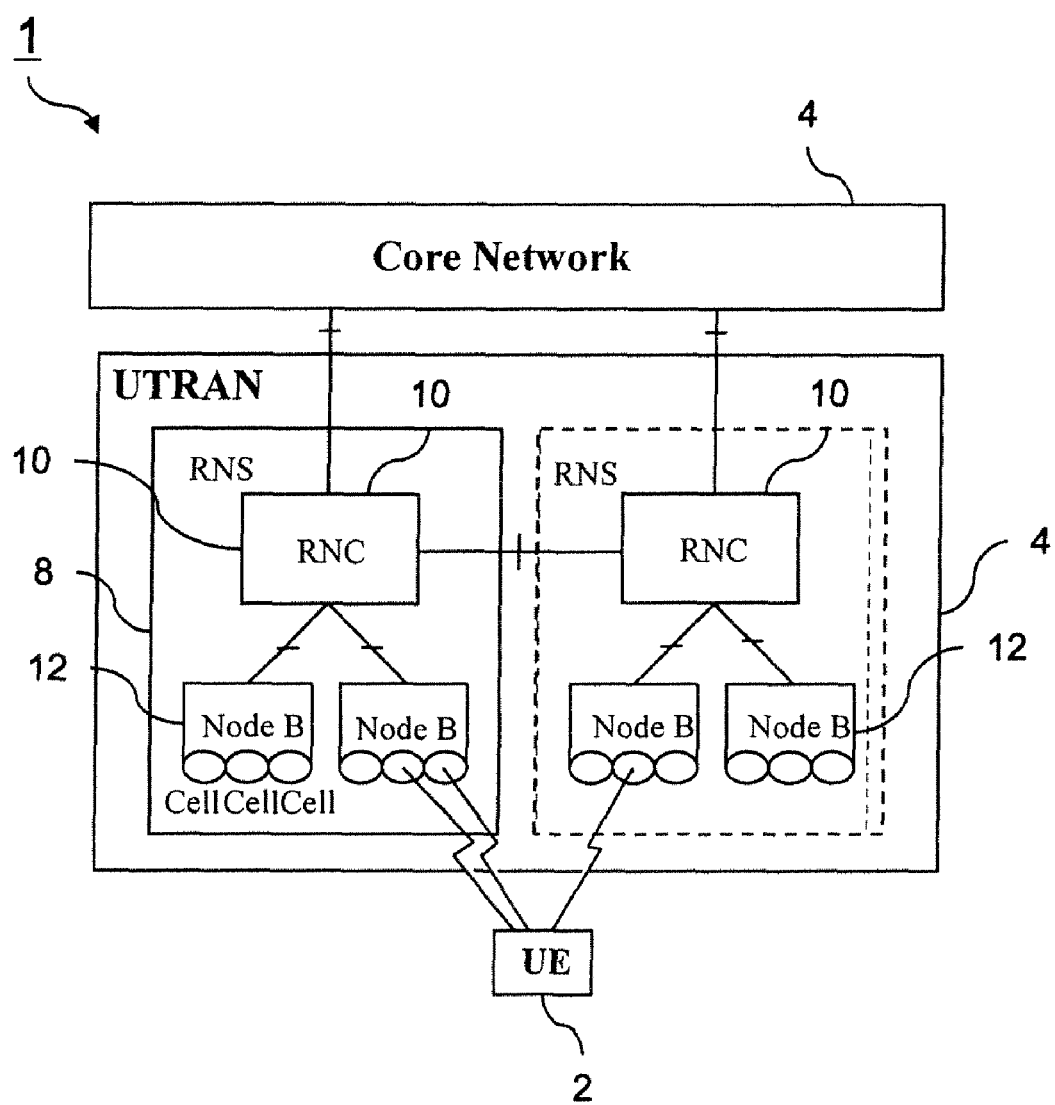
FIG. 1 illustrates a general UMTS network structure.
Figure 2:
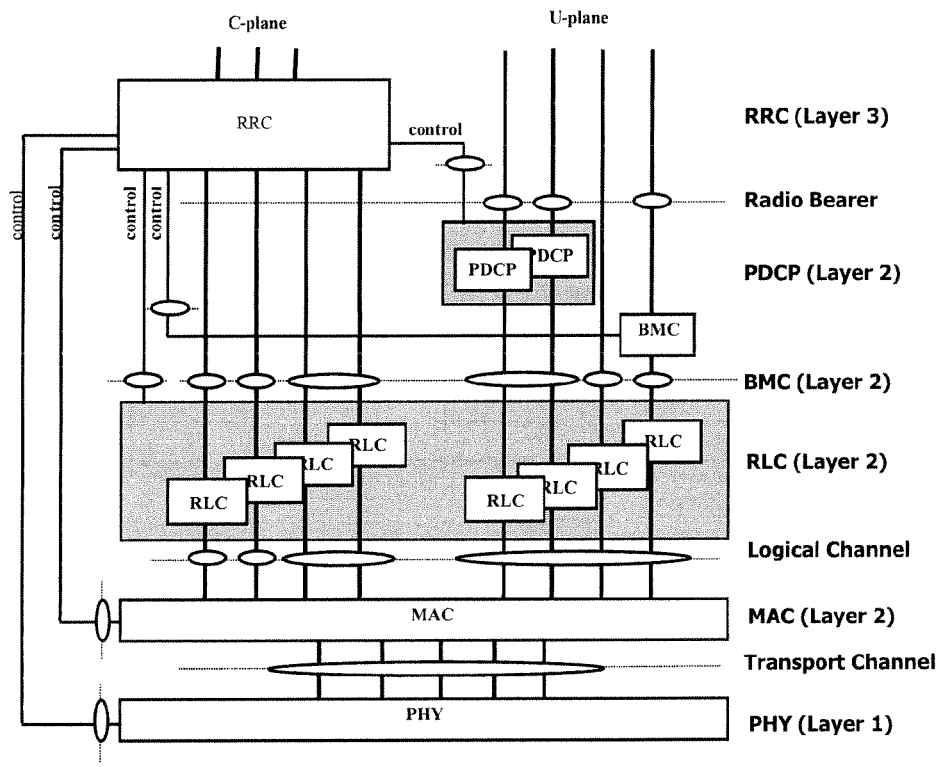
FIG. 2 illustrates a general radio interface protocol architecture used in the UMTS.
Figure 3:
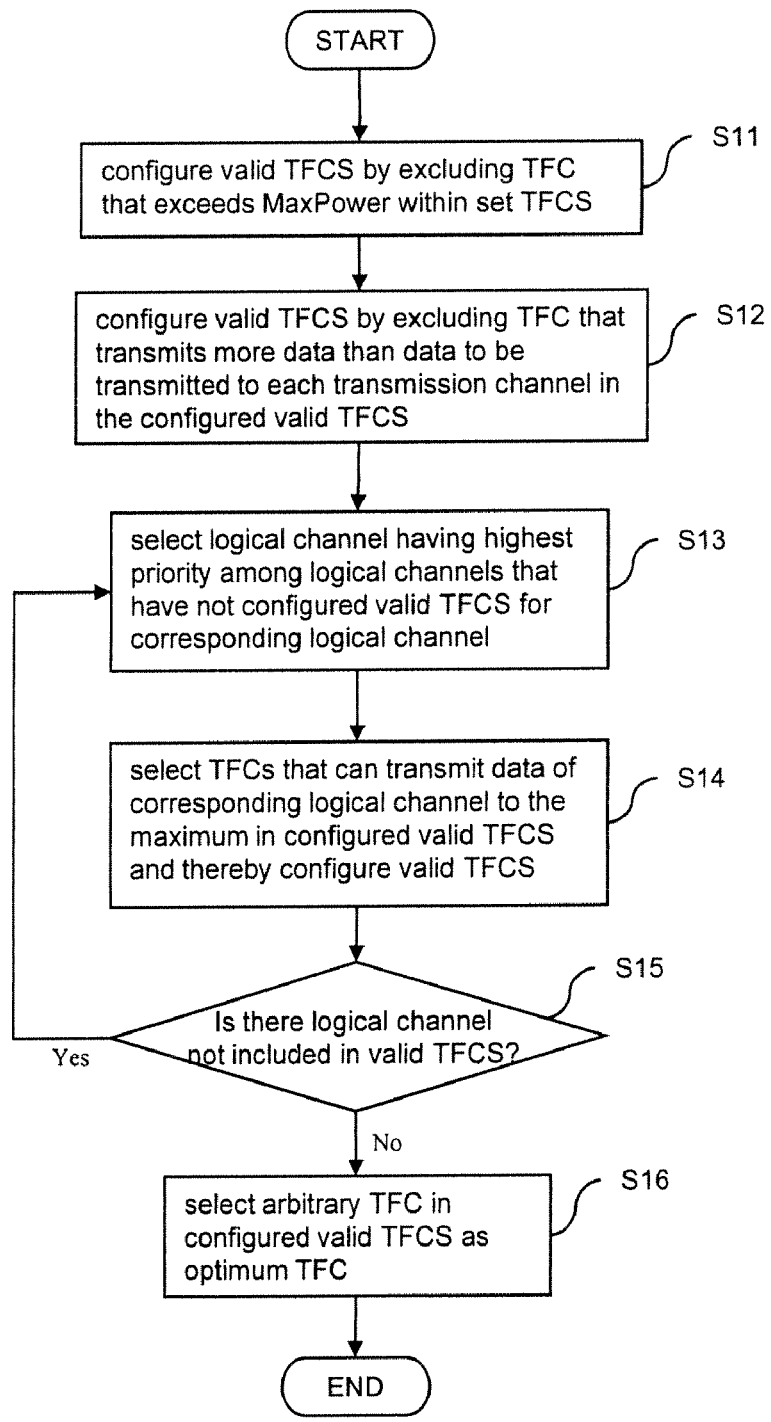
FIG. 3 illustrates a method for selecting a transport format combination by a MAC layer.
Figure 4:
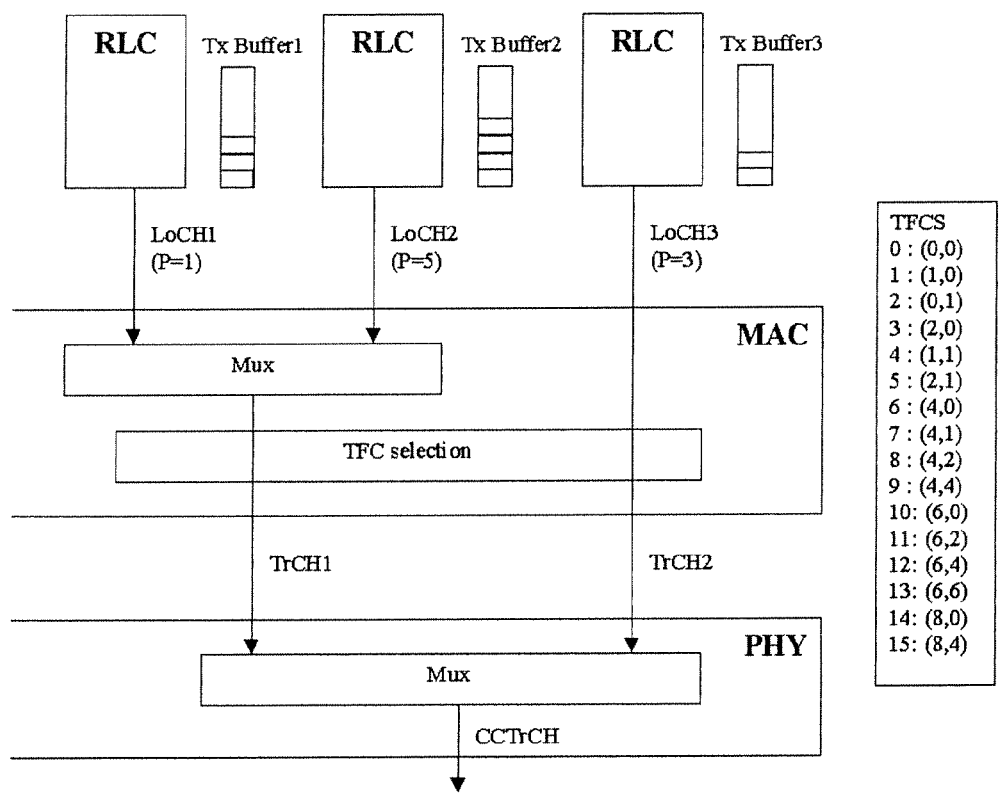
FIG. 4 illustrates a plurality of logical channels and a plurality of transport channels multiplexed into one radio channel.
Figure 5:
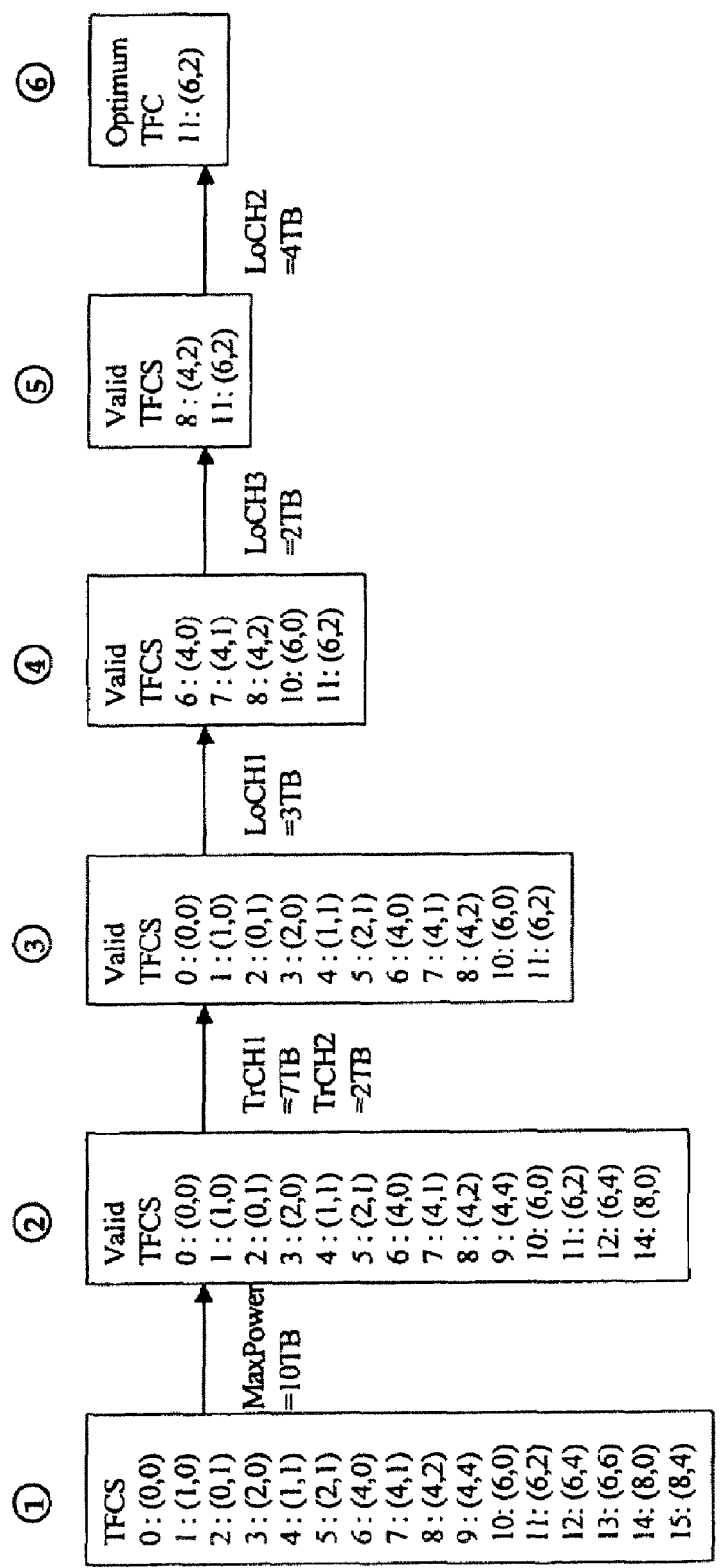
FIG. 5 illustrates a method for selecting a transport format combination when a number of transport blocks of a logical channel having highest priority is 3.
Figure 6:
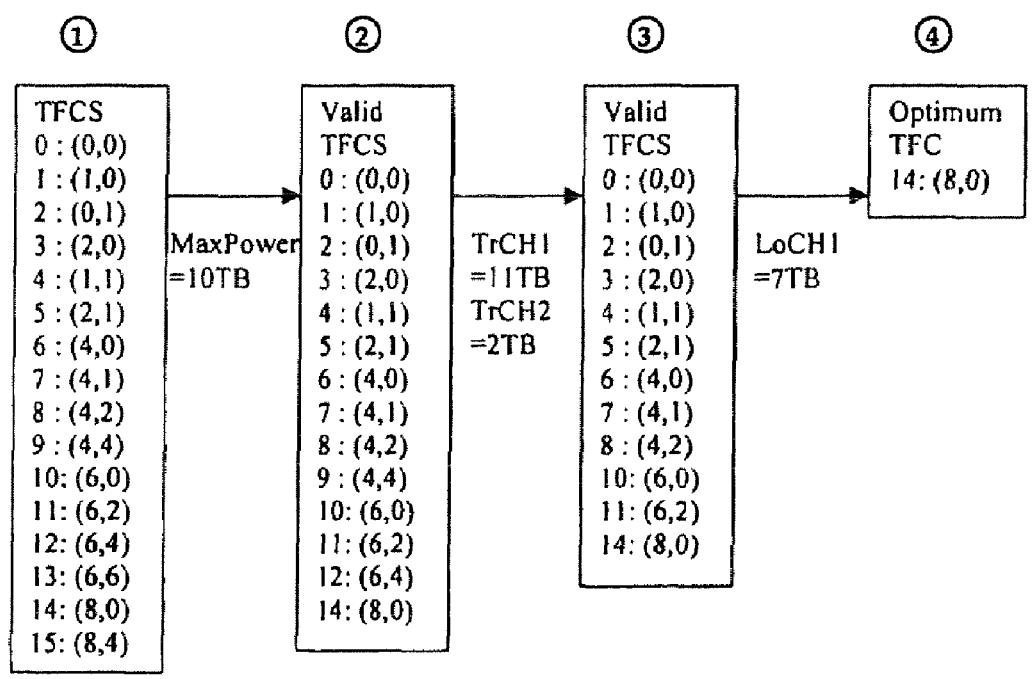
FIG. 6 illustrates a method for selecting a transport format combination when a number of transport blocks of a logical channel having highest priority is 7.

If there is a logical channel not included in the QoS guaranteed TFCS, the MAC layer returns to the step of S24 of FIG. 13. However, if there is not a logical channel not included in the QoS guaranteed TFCS, the MAC layer configures the QoS guaranteed TFCS as a valid TFCS (S29 of FIG. 13). The subsequent processes are the same as those of the general TFC selection method, as shown in FIG. 3.

More specifically, if a QoS guaranteed TFCS is configured by considering only a minimum QoS irrespective of the amount of data to be transmitted via a logical channel according to the second method of the present invention, the second problem of the first method of the present invention is caused, whereby the RLC layer generates a padding block or a protocol error is generated when data to be transmitted does not exist. Accordingly, even if a logical channel has a defined minimum QoS, the amount of data of the corresponding logical channel must also be considered when configuring a QoS guaranteed TFCS as shown in step of S25 of FIG. 13.

In the present invention, a service quality of a certain level is guaranteed even in service having a low priority by selecting a transport format combination wherein not only a priority of each service is considered but also a service quality is considered by an MAC layer when transporting services having different QoSs and different priorities by multiplexing.

In the present invention, the MAC layer selects a TFC by considering an amount of data to be transmitted via a logical channel with a minimum QoS guaranteed, thereby preventing generation of a padding block or a protocol error.

Figure 14:
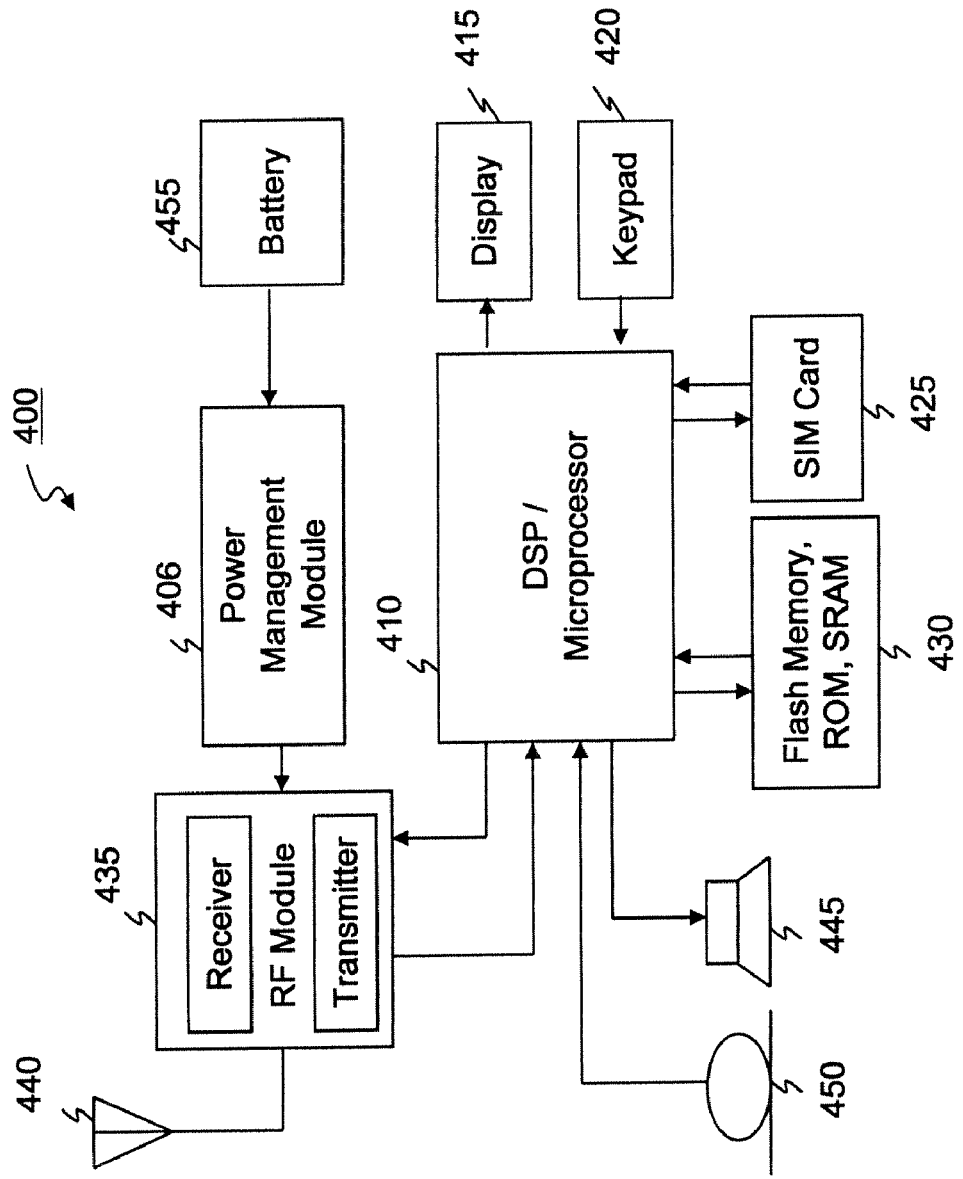
FIG. 14 illustrates a terminal for selecting a transport format combination guaranteed a minimum QoS by an MAC layer in accordance with one embodiment of the present invention.

Referring to FIG. 14, a block diagram of a mobile communication device 400 of the present invention is illustrated, for example a mobile phone for performing the methods of the present invention. The mobile communication device 400 includes a processing unit 410 such as a microprocessor or digital signal processor, an RF module 435, a power management module 406, an antenna 440, a battery 455, a display 115, a keypad 420, a storage unit 430 such as flash memory, ROM or SRAM, a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435, to initiate communication, for example, transmit radio signals comprising voice communication data. The RF module 435 comprises a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 445, for example.

The processing unit 410 is adapted to store message history data of messages received from and messages transmitted to other users in the storage unit 430, receive a conditional request for message history data input by the user, process the conditional request to read message history data corresponding to the conditional request from the storage unit, and output the message history data to the display unit 415. The storage unit 430 is adapted to store message history data of the received messages and the transmitted messages.

Figure 15:
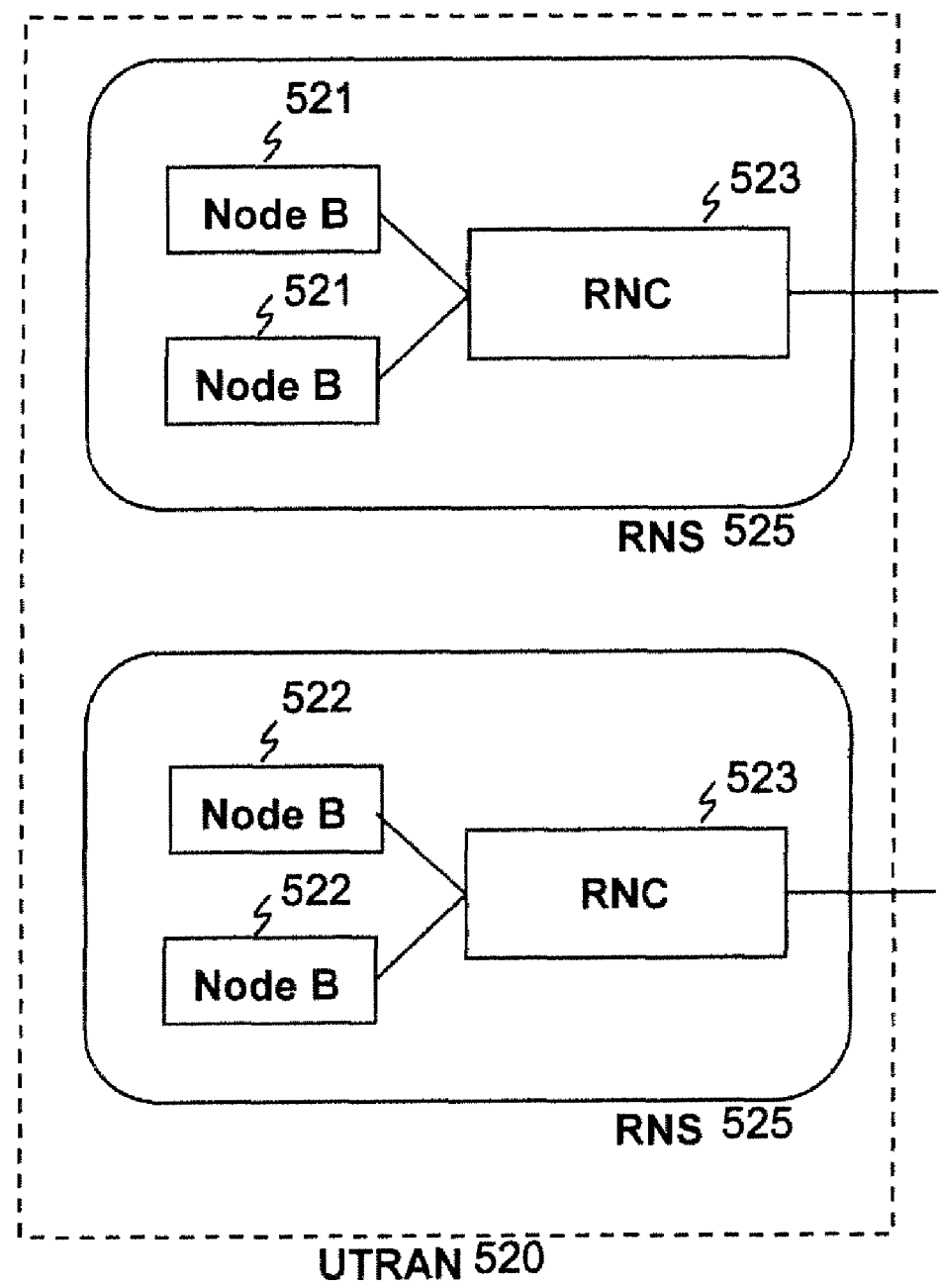
FIG. 15 illustrates a network for selecting a transport format combination guaranteed a minimum QoS by an MAC layer in accordance with one embodiment of the present invention.

FIG. 15 illustrates a block diagram of a UTRAN 520 according to the preferred embodiment of the present invention. The UTRAN 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 4. Furthermore, the RNC 523 is adapted to perform the methods of the present invention.

The Node-Bs 521 receive information sent by the physical layer of the terminal 400 through an uplink, and transmit data to the terminal through a downlink. The Node-Bs 521 operate as access points, or as a transmitter and receiver, of the UTRAN 520 for the terminal 400. It will be apparent to one skilled in the art that the mobile communication device 400 may be readily implemented using, for example, the processing unit 410 or other data or digital processing device, either alone or in combination with external support logic.

By utilizing the present invention, the user of a mobile communication device may select a transport format combination for transmitting a plurality of data units within a transmission time interval by multiplexing data units from a plurality of upper layer channels to a lower layer channel, the transport format combination selected from a determined transport format combination set and a transmission priority exists for transmitting the data units from each of the plurality of upper layer channels, wherein at least one of the plurality of upper layer channels has an associated minimum quality of service (QoS) requirement and the transport format combination is selected such that the minimum quality of service (QoS) for the at least one upper layer channel is guaranteed.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for allocating resources to transmit data from an upper layer to a lower layer in a mobile communication system, the method comprising:
 configuring by a radio resource control (RRC) layer a first amount of data to be transmitted for each logical channel;
 allocating resources by a medium access control (MAC) layer, wherein the resources are allocated for each logical channel according to the first amount of data to be transmitted for each logical channel, wherein a resource allocation is respectively guaranteed for all logical channels having data to be transmitted such that at least the respective first amount of data to be transmitted for all logical channels is transmitted; and
 allocating any remaining resources by the MAC layer, wherein the any remaining resources are allocated for each logical channel in order of priority of the logical channels according to a second amount of data to be transmitted for each logical channel;
 wherein the first amount of data to be transmitted for each logical channel is associated with a quality of service (QoS),
 wherein the resources are related to at least one of a transport block (TB), a transport format combination (TFC), or a transport format combination set (TFCS),
 wherein allocating resources for each logical channel with respect to the first amount of data to be transmitted for each logical channel is performed in order of priority of the logical channels.

2. The method of claim 1, further comprising:
 transmitting the respective first amount of data for all logical channels and the second amount of data to a network.

3. The method of claim 1, wherein the first amount of data to be transmitted for each logical channel is related to at least one of a minimum bit rate, a prioritized bit rate and a minimum transfer delay.

4. The method of claim 1, wherein the RRC layer indicates the first amount of data to be transmitted for each logical channel to the MAC layer.

5. The method of claim 1, wherein the lower layer is a physical (PHY) layer.

6. The method of claim 1, wherein an amount of data to be transmitted for a higher priority logical channel is greater or equal to an amount of data to be transmitted for a lower priority logical channel.

7. The method of claim 1, wherein the first amount of data to be transmitted for each logical channel is associated with a respective radio bearer (RB).

8. The method of claim 1, wherein information related to the TFC and the TFCS is received by the RRC layer.

9. The method of claim 8, wherein the RRC layer is an RRC layer of a mobile terminal and receives the information related to the TFC and the TFCS from an RRC layer of a network.

10. The method of claim 9, wherein the RRC layer of the mobile terminal informs the MAC layer of the received information related to the TFC and the TFCS.

11. The method of claim 1, wherein the first amount of data to be transmitted for each logical channel is associated with a minimum quality of service (QoS).

12. The method of claim 1, wherein the first amount of data is a minimum amount of data to be transmitted for each logical channel.

13. The method of claim 1, wherein the second amount of data is any additional amount of data to be transmitted for each logical channel.

* * * * *